United States Patent
Noda et al.

(10) Patent No.: US 8,205,584 B2
(45) Date of Patent: Jun. 26, 2012

(54) CONTROL DEVICE FOR VARIABLE VALVE MECHANISM

(75) Inventors: Minoru Noda, Aichi-ken (JP); Naohide Fuwa, Aichi-ken (JP); Seiko Tamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 331 days.

(21) Appl. No.: 12/520,992

(22) PCT Filed: Dec. 26, 2007

(86) PCT No.: PCT/JP2007/074891
§ 371 (c)(1),
(2), (4) Date: Jun. 24, 2009

(87) PCT Pub. No.: WO2008/078756
PCT Pub. Date: Jul. 3, 2008

(65) Prior Publication Data
US 2010/0071644 A1 Mar. 25, 2010

(30) Foreign Application Priority Data
Dec. 27, 2006 (JP) .................................. 2006-352708

(51) Int. Cl.
*F01L 1/34* (2006.01)
(52) U.S. Cl. .................................. 123/90.16; 123/90.15
(58) Field of Classification Search ............... 123/90.15, 123/90.16
See application file for complete search history.

(56) References Cited

U.S. PATENT DOCUMENTS

| | | | |
|---|---|---|---|
| 4,607,523 A | | 8/1986 | Takahashi et al. |
| 5,664,529 A | * | 9/1997 | Kato et al. .................. 123/90.15 |
| 7,293,537 B2 | | 11/2007 | Arai et al. |
| 2001/0023674 A1 | * | 9/2001 | Shimizu et al. ............ 123/90.18 |
| 2005/0211207 A1 | | 9/2005 | Urushihata et al. |
| 2005/0229883 A1 | | 10/2005 | Arai et al. |
| 2005/0235937 A1 | | 10/2005 | Tani |
| 2006/0174849 A1 | | 8/2006 | Okamoto |
| 2006/0190161 A1 | | 8/2006 | Nakamura |
| 2006/0191512 A1 | * | 8/2006 | Yoshihara et al. ............ 123/348 |

(Continued)

FOREIGN PATENT DOCUMENTS
EP 1 431 548 A2 6/2004
(Continued)

OTHER PUBLICATIONS

European Search Report issued Jan. 2, 2012 in European Application No. 07860120.0.

*Primary Examiner* — Zelalem Eshete
(74) *Attorney, Agent, or Firm* — Oblon, Spivak, McClelland, Maier & Neustadt, L.L.P.

(57) ABSTRACT

A brushless motor of a variable valve mechanism varies a actuation parameter of an intake valve of an engine. A position sensor outputs a pulse signal when the brushless motor rotates. A position counter calculates a counter value by counting edges of the pulse signal. A motor control device obtains a detection value of a motor rotational angle based on the counter value when the motor control device is in a powered state. An engine control device determines that the detection value of the motor rotational angle is displaced from the actual value when the engine control device detects that the engine is operating and the motor control device portion is in a non-powered state.

7 Claims, 10 Drawing Sheets

U.S. PATENT DOCUMENTS

2006/0260573 A1   11/2006   Urushihata et al.

FOREIGN PATENT DOCUMENTS

| | | |
|---|---|---|
| JP | 61-160545 | 7/1986 |
| JP | 63-111412 | 5/1988 |
| JP | 4 255481 | 9/1992 |
| JP | 7 75369 | 3/1995 |
| JP | 2000 73795 | 3/2000 |
| JP | 2001 82192 | 3/2001 |
| JP | 2002 161764 | 6/2002 |
| JP | 2004 76265 | 3/2004 |
| JP | 2004 162706 | 6/2004 |
| JP | 2005 16456 | 1/2005 |
| JP | 2006-161631 | 6/2006 |
| JP | 2007 24786 | 2/2007 |
| JP | 2007 43853 | 2/2007 |

* cited by examiner

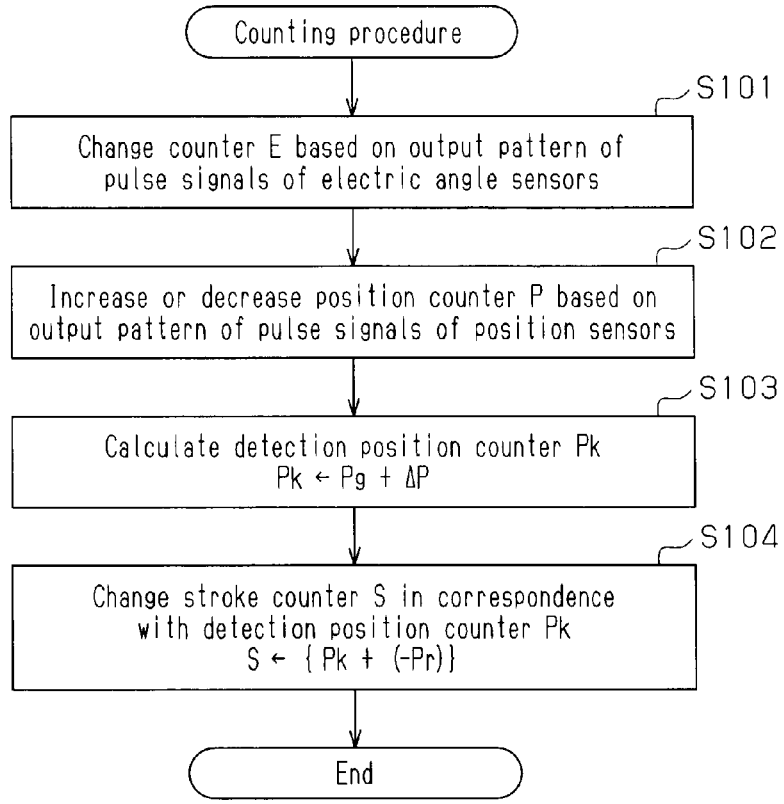

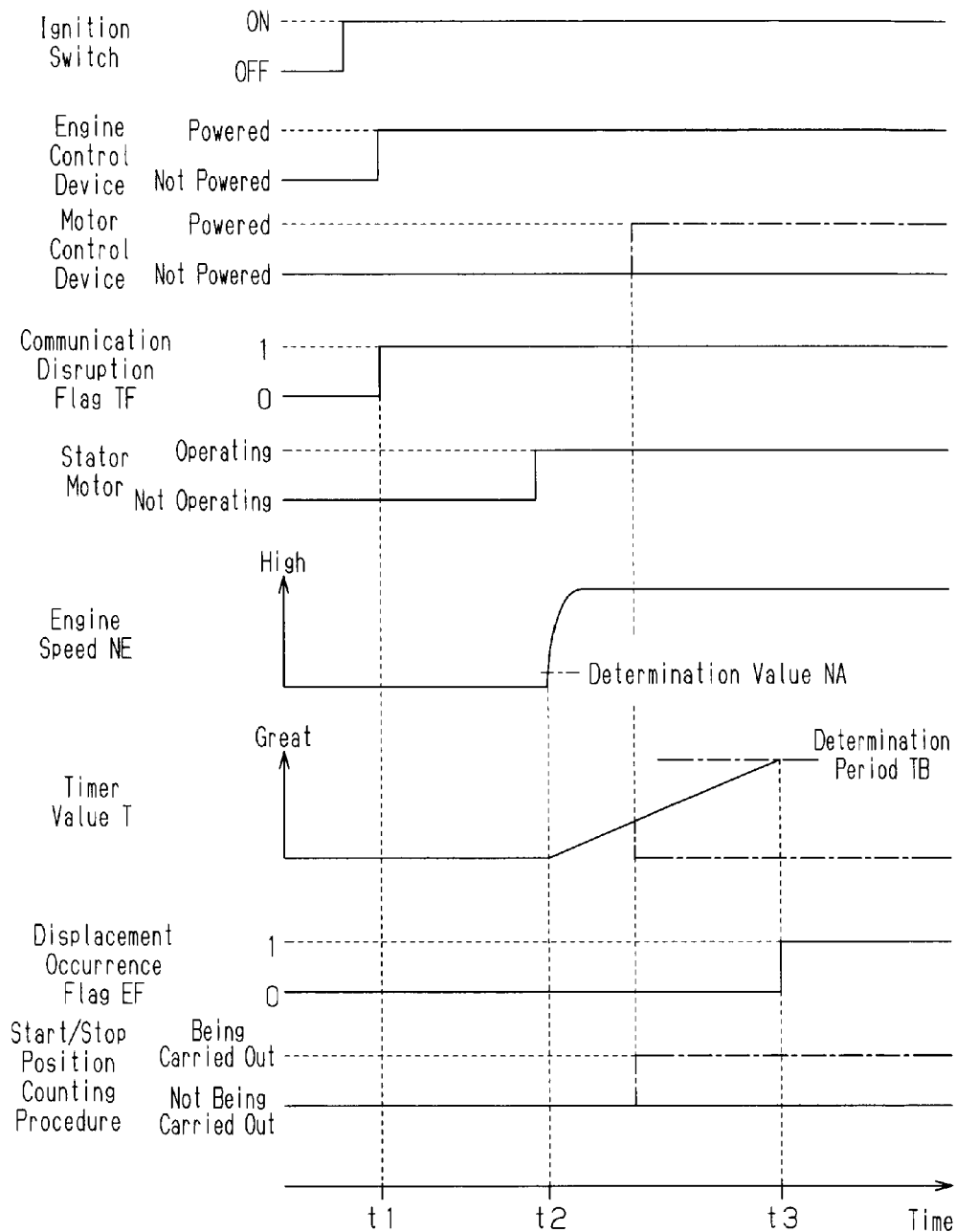

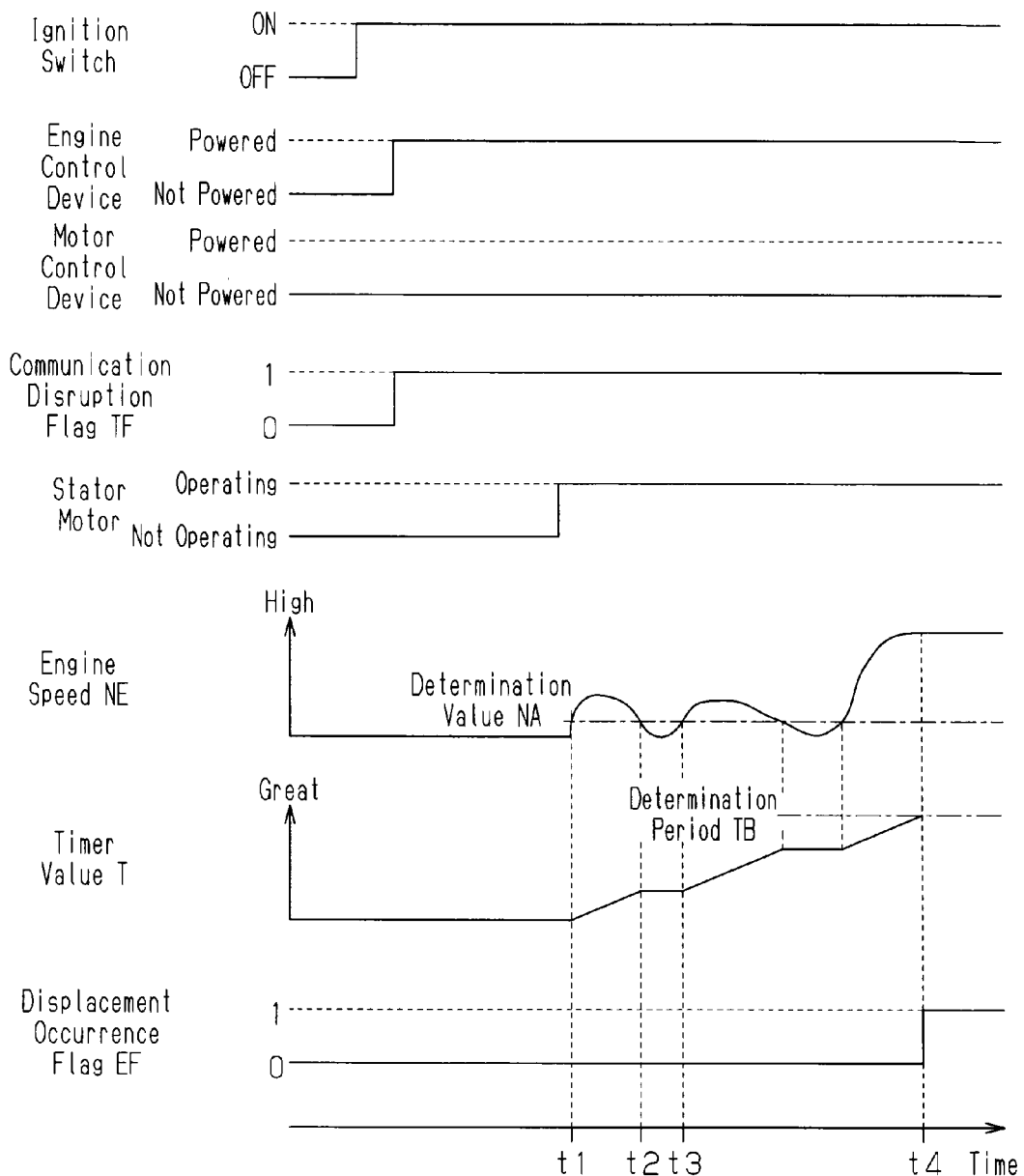

US 8,205,584 B2

CONTROL DEVICE FOR VARIABLE VALVE MECHANISM

FIELD OF THE INVENTION

The present invention relates to a control device of a variable valve mechanism that varies valve actuation parameters of an internal combustion engine.

BACKGROUND OF THE INVENTION

The internal combustion engine may include a variable valve mechanism that varies actuation parameters of engine valves such as intake valves or exhaust valves. The variable valve mechanism is driven by, for example, a motor rotating in a set angular range. In other words, current values representing the valve actuation parameters correspond to the motor rotational angle. Accordingly, in order to accurately control the valve actuation parameters, it is important to accurately detect and control the motor rotational angle.

Patent Document 1 discloses a motor rotational angle detection device. A position sensor, which is, for example, an encoder, detects a pulse signal when a motor rotates. A position counter counts the pulse signal and obtains a counter value. The motor rotational angle is detected based on the counter value.

Patent Document 1: Japanese Laid-Open Patent Publication No. 2004-76265

SUMMARY OF THE INVENTION

The motor rotational angle detection device, when not powered, cannot detect a change in the actual motor rotational angle. However, the actual motor rotational angle may change even when the motor rotational angle detection device is not powered.

It is an objective of the present invention to provide a control device of a variable valve mechanism capable of effectively determining that a detection value of the rotational angle of a motor driving the variable valve mechanism is displaced from the actual value.

To achieve the foregoing objective and in accordance with one aspect of the present invention, a control device of a variable valve mechanism is provided. The variable valve mechanism has a motor that varies an actuation parameter of a valve of an internal combustion engine. A rotational angle of the motor being restricted to a set angular range. The control device detects a current value of the valve actuation parameter based on the motor rotational angle. The control device includes a position sensor, a position counter, a detecting portion, and a determining portion. The position sensor outputs a pulse signal when the motor rotates. The position counter calculates a position counter value by counting edges of the pulse signal. Wherein when in a powered state, the detecting portion obtains a detection value of the motor rotational angle based on the counter value. The determining portion detects an operating state of the engine and the powered state of the detecting portion. When detecting that the engine is operating and the detecting portion is in a non-powered state, the determining portion determines that the detection value of the motor rotational angle is displaced from the actual value.

BRIEF DESCRIPTION OF THE DRAWINGS

FIG. 3($d$) and FIG. 3($e$) represent pulse signals output by a first position sensor S4 and a second position sensor S5, respectively;

FIG. 3($f$) represents change of an electric angle counter value Ec with respect to the motor rotational angle θ;

FIG. 3($g$) represents change of a position counter value Pg;

FIG. 3($h$) represents change of a stroke counter value Sg;

FIG. 4 is a flowchart representing a counting procedure performed by the motor control device 50 illustrated in FIG. 2;

FIG. 5 is a table representing addition/subtraction of the position counter value of FIG. 3($g$) based on the pulse signals of FIGS. 3($d$) and 3($e$);

FIG. 10 is a timing chart representing change of a timer value T and change of a displacement occurrence flag EF when the engine speed NE increases stably after the engine is started; and FIG. 11 is a timing chart representing change of the timer value T and change of the displacement occurrence flag EF when the engine speed changes unstably after the engine is started.

DETAILED DESCRIPTION OF THE PREFERRED EMBODIMENTS

FIGS. 1 to 11 show one embodiment of the present invention. The embodiment relates to a control device of a variable valve mechanism 14. The control device includes a motor control device 50 and an engine control device 51.

Figure 1:
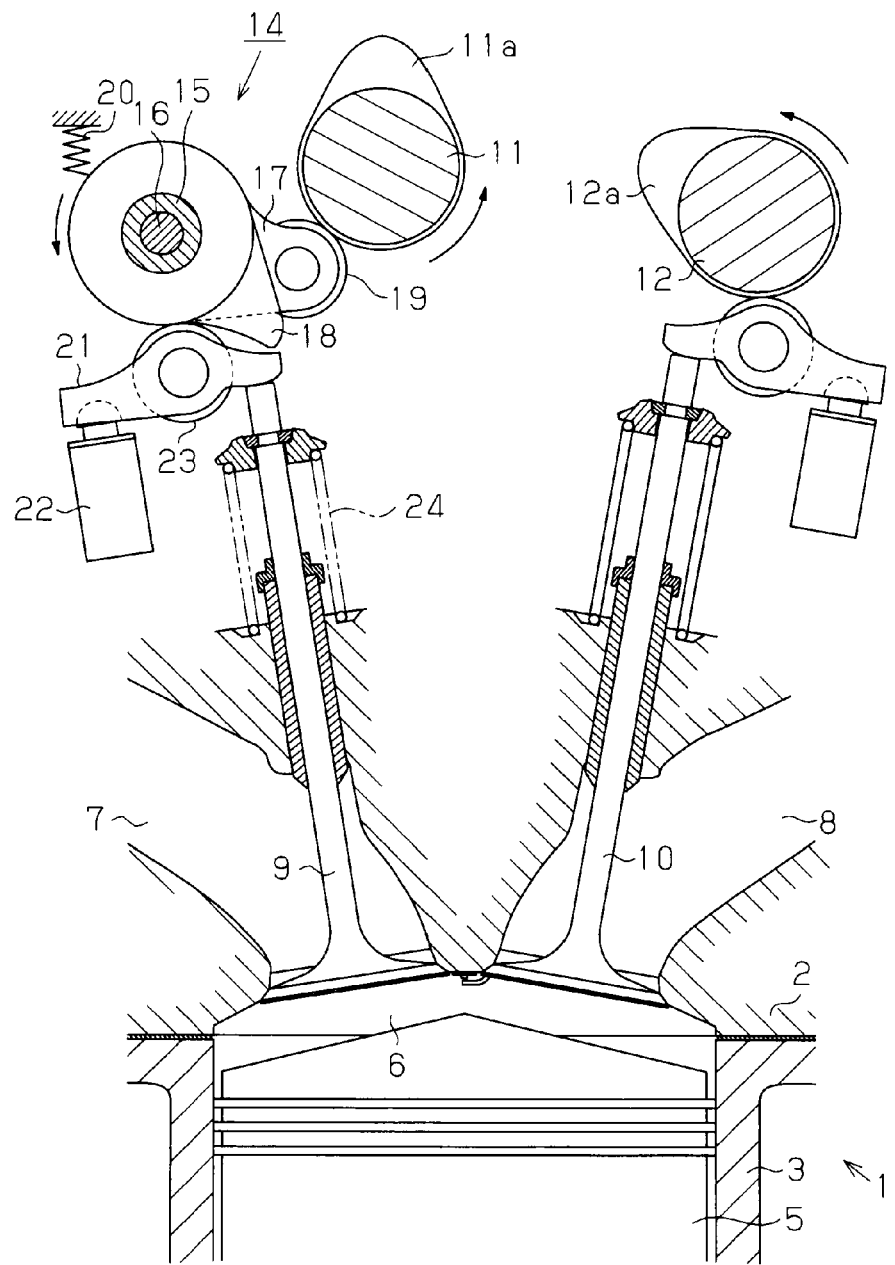
FIG. 1 is a cross-sectional view showing the vicinity of a cylinder head of an internal combustion engine employing a control device of a variable valve mechanism according to one embodiment of the present invention.

FIG. 1 is the cross-sectional view showing the structure of the vicinity of a cylinder head 2 of an engine 1.

The engine 1, which is an internal combustion engine, includes the cylinder head 2, a cylinder block 3, and a piston 5. The cylinder head 2, the cylinder block 3, and the piston 5 define a combustion chamber 6. An intake passage 7 and an exhaust passage 8 are connected to the combustion chamber 6. Communication between the intake passage 7 and the combustion chamber 6 is selectively permitted and blocked by an intake valve 9, which selectively opens and closes. Communication between the exhaust passage 8 and the combustion chamber 6 is selectively permitted and blocked by an exhaust valve 10, which selectively opens and closes.

An intake camshaft 11 driving the intake valve 9 and an exhaust camshaft 12 driving the exhaust valve 10 are arranged on the cylinder head 2. The intake camshaft 11 and the exhaust camshaft 12 are rotated through transmission of rotation of the crankshaft of the engine 1 to the camshafts 11, 12. The intake camshaft 11 and the exhaust camshaft 12 include an intake cam 11a and an exhaust cam 12a, respectively. The intake cam 11a and the intake camshaft 11 rotate integrally to selectively open and close the intake valve 9. The exhaust cam 12a and the exhaust camshaft 12 rotate integrally to selectively open and close the exhaust valve 10.

The engine 1 has a variable valve mechanism 14 arranged between the intake cam 11a and the intake valve 9. The variable valve mechanism 14 varies the maximum lift amount of the intake valve 9 and the duration angle of the intake cam 11a. The maximum lift amount of the intake valve 9 and the duration angle of the intake cam 11a represent the valve actuation parameters of the intake valve 9. The variable valve mechanism 14 is controlled in such a manner that, as the necessary intake air amount increases, the maximum lift amount and the duration angle increase. That is, the variable valve mechanism 14 varies valve actuation parameters of engine valves including the intake valve 9 and the exhaust valve 10.

The variable valve mechanism 14 has a locker shaft 15, a control shaft 16, an input arm 17, and an output arm 18. The locker shaft 15 is fixed to the cylinder head 2 and shaped as a pipe extending parallel with the intake camshaft 11. The control shaft 16 is shaped like a bar and passed through the locker shaft 15. The input arm 17 swings about the axis of the control shaft 16. The output arm 18 swings about the axis in correspondence with swinging of the input arm 17.

A roller 19 is rotatably attached to the input arm 17. A coil spring 20 presses the roller 19 against the intake cam 11a. The output arm 18 is pressed against the locker arm 21 when swinging, thus lifting the intake valve 9 through the locker arm 21.

A first end of the locker arm 21 is supported by a lash adjuster 22 and a second end of the locker arm 21 contacts the intake valve 9. The locker arm 21 is urged toward the output arm 18 by the valve spring 24 of the intake valve 9. As a result, the roller 23 is pressed against the output arm 18. In other words, the valve spring 24 urges the intake valve 9. The roller 23 is rotatably supported between the first end and the second end of the locker arm 21. Accordingly, when the input arm 17 and the output arm 18 are caused to swing by rotation of the intake cam 11a, the output arm 18 lifts the intake valve 9 through the locker arm 21, thus selectively opening and closing the intake valve 9.

The control shaft 16 of the variable valve mechanism 14 moves axially in such a manner as to change the position of the control shaft 16 relative to the swinging direction of the input arm 17 and that of the output arm 18. This varies the maximum lift angle of the intake valve 9 and the duration angle of the intake cam 11a with respect to the intake valve 9. As the input arm 17 and the output arm 18 are brought closer to each other with respect to the swinging directions, the maximum lift amount of the intake valve 9 and the duration angle of the intake cam 11a both decrease. In contrast, as the input arm 17 and the output arm 18 separate from each other with respect to the swinging directions, the maximum lift amount of the intake valve 9 and the duration angle of the intake cam 11a both increase.

Figure 2:
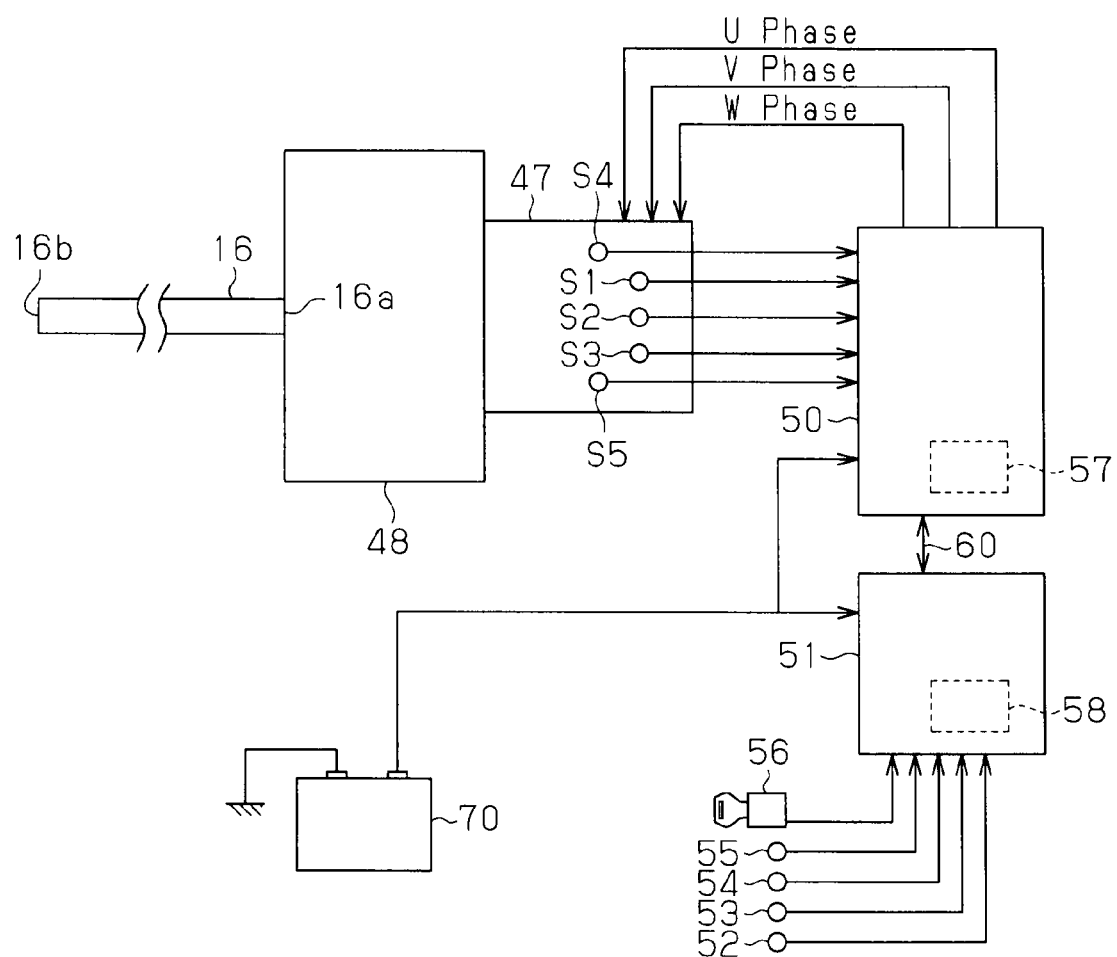
FIG. 2 is a block diagram illustrating a brushless motor 47 driving the variable valve mechanism shown in FIG. 1, a motor control device 50, and an engine control device 51.

As illustrated in FIG. 2, the variable valve mechanism 14 includes a brushless motor 47, which axially moves the control shaft 16. The motor control device 50 controls the brushless motor 47. The motor control device 50 is connected to the engine control device 51 through a communication cable 60 in such a manner that mutual communication is allowed between the motor control device 50 and the engine control device 51. The engine control device 51 controls the engine 1 in various manners.

With reference to FIG. 2, the brushless motor 47 is connected to a basal end 16a of the control shaft 16 through a conversion mechanism 48. The conversion mechanism 48 converts rotation of the brushless motor 47 into axial linear movement of the control shaft 16. When the brushless motor 47 rotates in a set angular range, the control shaft 16 moves axially and the variable valve mechanism 14 is actuated. The set angular range of the brushless motor 47 is set to, for example, a range corresponding to ten revolutions of the brushless motor 47, or 0° to 3600°.

As the brushless motor 47 rotates in a forward direction, the control shaft 16 moves away from the brushless motor 47. This changes the position of the input arm 17 and the position of the output arm 18 relative to each other with respect to the swinging directions in such a manner that the input arm 17 and the output arm 18 are brought closer to each other. As the brushless motor 47 rotates in a reverse direction, the control shaft 16 moves toward the brushless motor 47, thus changing the position of the input arm 17 and the position of the output arm 18 relative to each other with respect to the swinging directions in such a manner that the input arm 17 and the output arm 18 separate from each other. Rotation of the brushless motor 47 changes the position of the input arm 17 and the position of the output arm 18 relative to each other with respect to the swinging directions. This varies the maximum lift amount of the intake valve 9 and the duration angle of the intake cam 11a.

The stator of the brushless motor 47 has a first electric angle sensor S1, a second electric angle sensor S2, a third electric angle sensor S3, a first position sensor S4, and a second position sensor S5. The rotor of the brushless motor 47 has a multipole magnet including four poles and a multipole magnet having 48 poles, in such a manner that the multipole magnets rotate integrally.

When the brushless motor 47 rotates, the first to third electric angle sensors S1 to S3 output pulse signals the phases of which are offset from one another as illustrated in FIGS. 3(a) to 3(c) in correspondence with the magnetic force of the four-pole magnet. The circumferential positions of the first to third electric angle sensors S1 to S3 are determined in such a manner as to obtain such pulse signals. The edge of the pulse signal output by each one of the first to third electric angle sensors S1 to S3 is generated whenever the brushless motor 47 rotates by 45°. The phase of the pulse signal of the first electric angle sensor S1 proceeds from the phase of the pulse signal of the second electric angle sensor S2 by the amount corresponding to rotation of 30° of the brushless motor 47. The phase of the pulse signal of the third electric angle sensor S3 is retarded from the phase of the pulse signal of the second electric angle sensor S2 by the amount corresponding to the rotation of 30° of the brushless motor 47.

When the brushless motor 47 rotates, the first and second position sensors S4, S5 output pulse signals represented in FIGS. 3(d) and 3(e) in correspondence with the magnetic force of the 48-pole magnet. The circumferential positions of the first and second position sensors S4, S5 are determined in such a manner as to obtain the pulse signals having the illustrated waveforms. The edge of the pulse signal output by each one of the first and second position sensors S4, S5 is generated whenever the brushless motor 47 rotates by 7.5°. The phase of the pulse signal of the first position sensor S4 is offset from the phase of the pulse signal of the second position sensor S5 by the amount corresponding to the rotation of the brushless motor 47 by 3.75°.

Accordingly, the angular interval between the edges of the pulse signals of the first to third electric angle sensors S1 to S3 is 15°, whereas the angular interval between the edges of the pulse signals of the first and second position sensors S4, S5 is 3.75°, which is shorter. Four edges are generated by the pulse signals of the first and second position sensors S4, S5 in a single interval of the pulse signals of the first to third electric angle sensors S1 to S3.

As illustrated in FIG. 2, the motor control device 50 is electrically connected to the first to third electric angle sensors S1 to S3, the first and second position sensors S4, S5, and the brushless motor 47. The motor control device 50 controls the brushless motor 47 to control the variable valve mechanism 14.

The motor control device 50 includes a CPU, a ROM, a RAM, a nonvolatile memory 57, and an input/output port. The CPU performs various calculation procedures. The ROM stores programs and data that are necessary for control. The RAM temporarily stores calculation results of the CPU. The input/output port inputs/outputs signals with respect to the exterior.

The motor control device 50 detects the relative rotational angle of the brushless motor 47 based on the pulse signals of the position sensors S4, S5. The motor control device then calculates the absolute rotational angle of the brushless motor 47 based on the relative rotational angle and a reference position, which has been learned in advance. The motor control device 50 rotates the brushless motor 47 by switching power supply among energizing phases such as the U phase, the V phase, and the W phase in correspondence with the patterns of the pulse signals of the first to third electric angle sensors S1 to S3.

The engine control device 51 also includes a CPU, a ROM, a RAM, and an input/output port. Various signals are input from the motor control device 50 to the input port of the engine control device 51 through the communication cable 60. Further, the followings are connected to the engine control device 51:

an accelerator sensor 52, which detects the depression amount of an accelerator pedal depressed by the driver of the vehicle, or the accelerator operating amount ACCP;

a throttle sensor 53, which detects the opening degree of a throttle valve arranged in the intake passage 7 of the engine 1, or the throttle opening degree TA;

an air flowmeter 54, which detects the amount of the air drawn into the combustion chamber 6 via the intake passage 7, or the intake air amount GA;

a crank angle sensor 55, which outputs a signal corresponding to rotation of the output shaft of the engine 1 in order to detect the engine speed NE; and an ignition switch 56 manipulated by the driver of the vehicle to output a signal corresponding to a current switch position.

The engine control device 51 also includes a timer 58. The timer 58 measures the period in which the engine speed NE is higher than or equal to a threshold value NA.

When the ignition switch 56 is switched on, or the ignition is turned on, the power is supplied from a battery 70 to the motor control device 50 and the engine control device 51. This starts mutual communication between the motor control device 50 and the engine control device 51 through the communication cable 60. Also, a starting motor is activated to start operation of the engine 1. When the ignition switch 56 is switched off, or the ignition is turned off, the power supply to the motor control device 50 and the engine control device 51 is blocked and the engine 1 is stopped after a prescribed procedure is completed.

The engine control device 51 acquires the operating state of the engine 1 based on detection signals from various sensors and various signals from the motor control device 50. The engine control device 51 outputs a command value to the motor control device 50 in order to drive the brushless motor 47 in correspondence with the operating state of the engine 1. The motor control device 50 drives the brushless motor 47 based on the command value. This moves the control shaft 16 axially, thus allowing the variable valve mechanism 14 to control the valve actuation parameters of the intake valve 9.

The valve actuation parameters of the intake valve 9 correspond to the axial position of the control shaft 16, or the motor rotational angle θ. Accordingly, in order to precisely control the valve actuation parameters of the intake valve 9, it is important to accurately detect the motor rotational angle θ and operate the brushless motor 47 in such a manner that the motor rotational angle θ represents a value corresponding to target valve actuation parameters.

(Obtaining Detection Value θd of Motor Rotational Angle θ)

Figure 3:
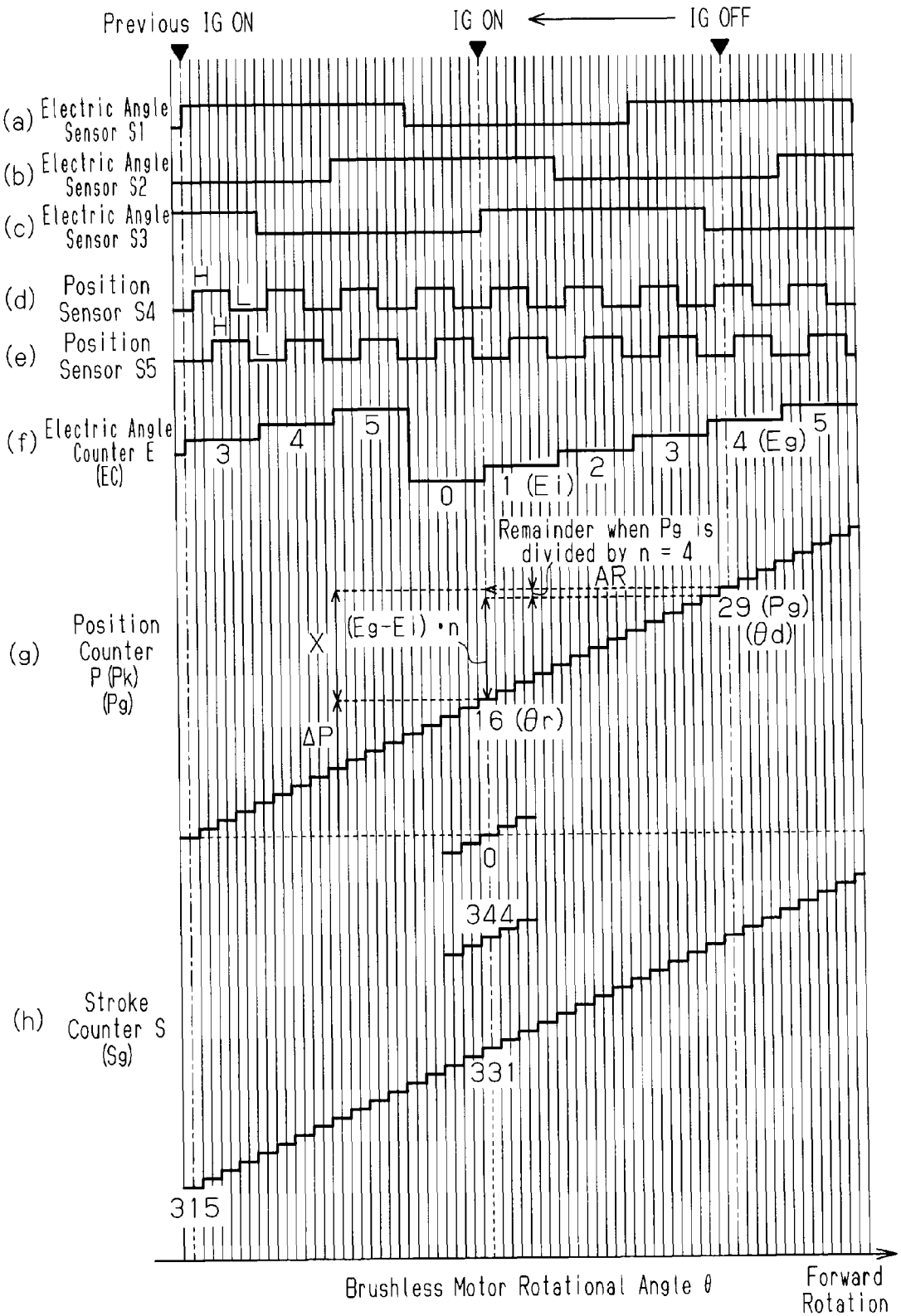
FIG. 3($a$), FIG. 3($b$), and FIG. 3($c$) represent pulse signals output by a first electric angle sensor S1, a second electric angle sensor S2, and a third electric angle sensor S3, respectively, with respect to a motor rotational angle θ.

The timing chart of FIG. 3 and the flowchart of FIG. 4 each represent a detection procedure for the motor rotational angle θ of the present embodiment.

FIGS. 3(a) to 3(c) represent the pulse signals output by the first to third electric angle sensors S1 to S3 with respect to the motor rotational angle θ. FIGS. 3(d) and 3(e) represent the pulse signals output by the first and second position sensors S4, S5. FIG. 3(f) represents change of the electric angle counter value Ec with respect to the motor rotational angle θ. FIG. 3(g) represents change of the position counter value Pg. FIG. 3(h) represents change of the stroke counter value Sg. The position counter P shows a detection position counter value Pk. The electric angle counter value Ec is a counter value of an electric angle counter E. The position counter value Pg is a counter value of a position counter P. The stroke counter value Sg is a counter value of a stroke counter S.

Using the electric angle counter E, the energizing phases of the brushless motor 47 are switched to operate the brushless motor 47. The position counter value Pg represents the axial movement amount of the control shaft 16 after the ignition is turned on. In other words, the position counter value Pg represents the change of the relative rotational angle of the brushless motor 47 after the ignition is turned on. The stroke counter value Sg represents the axial position of the control shaft 16 with reference to the state in which the control shaft 16 is moved maximally toward the limit of movement corresponding to a distal end 16b. When the control shaft 16 is located at the limit of movement corresponding to the distal end 16b, the maximum lift amount of the intake valve 9 and the duration angle of the intake cam 11a are both minimum. That is, the stroke counter value Sg represents the motor rotational angle θ with reference to the end of the set angular range of the brushless motor 47. In other words, the stroke counter value Sg represents the absolute rotational angle of the brushless motor 47.

FIG. 4 represents a counting procedure by which the electric counter value Ec, the position counter value Pg, and the stroke counter value Sg are changed. The motor control device 50 operates by a cycle shorter than the interval between the edges of the pulse signals of the first and second position sensors S4, S5. The motor control device 50, which performs the counting procedure, configures a detecting portion.

Once the counting procedure for each one of the electric angle counter value Ec, the position counter value Pg, and the stroke counter value Sg is started, the motor control device 50 changes the electric angle counter value Ec in step S101 as represented in FIG. 3(f), based on the output pattern of the pulse signals of the first to third electric angle sensors S1 to S3, which are represented in FIGS. 3(a) to 3(c).

When the brushless motor 47 rotates in a forward direction (a rightward direction as viewed in FIG. 3), successive integer values in the range of 0 to m are assigned to the electric angle counter value Ec in the ascending order in correspondence with the output patterns of the pulse signals of the first to third electric angle sensors S1 to S3. In the present embodiment, m is 5. The electric angle counter value Ec is assigned with 0→1→2→3→4→5→0 in this order.

When the brushless motor 47 rotates in a reverse direction (a leftward direction as viewed in FIG. 3), successive integer values in the range of 0 to m are assigned to the electric angle counter value Ec in the descending order in correspondence with the output patterns of the pulse signals of the first to third electric angle sensors S1 to S3. In the present embodiment, the electric counter value Ec is assigned with 5→4→3→2→1→0→5 in this order. The brushless motor 47 is rotated in the forward direction or the reverse direction by switching the energizing phases of the brushless motor 47 based on the electric angle counter value Ec.

In step S102, the motor control device 50 selectively increases and decreases the position counter value Pg in correspondence with the output pattern of the pulse signals of the first and second position sensors S4 and S5.

With reference to FIG. 5, the position counter value Pg is selectively incremented and decremented by 1 in correspondence with combination of a high level H, a low level L, a rising edge ↑, and a falling edge ↓ of the pulse signals of the first and second position sensors S4 and S5. In other words, the position counter value Pg is the count of the edges of the pulse signals of the first and second position sensors S4, S5.

When the brushless motor 47 rotates forward, the position counter value Pg is incremented by 1 for each edge of the pulse signals of the first and second position sensors S4 and S5, which are illustrated in FIGS. 3(d) and 3(e), and proceeds rightward as viewed in FIG. 3(g). When the brushless motor 47 rotates reversely, the position counter value Pg is decremented by 1 for every edge and proceeds leftward as viewed in FIG. 3(g). When the ignition switch 56 is switched off, or the ignition is turned off, the position counter P is reset so that the counter P shows 0. Accordingly, the position counter value Pg represents the axial movement amount of the control shaft 16, or the change of the motor rotational angle $\theta$, which are caused after the ignition is turned on.

The stroke counter value Sg represented in FIG. 3(h) is changed in correspondence with the change of the position counter value Pg represented in FIG. 3(g). Specifically, in step S103, the motor control device 50 calculates a detection position counter value Pk by adding a correction value $\Delta P$ to the position counter value Pg. In step S104, the motor control device 50 obtains the stroke counter value Sg by adding a value -Pr, which is a learned value Pr with a reversed sign, to the detection position counter value Pk. In other words, the following equations are satisfied: Pk=Pg+$\Delta$P, Sg=Pk−Pr. In an initial state, the correction value $\Delta P$ is 0.

The learned value Pr is the detection position counter value Pk in the state in which the control shaft 16 is moved to the limit of movement corresponding to the distal end 16b of the movable range, or the motor rotational angle $\theta$ is changed to the limit of movement of the set angular range. In other words, the learned value Pr is an initial value of the motor rotational angle $\theta$. The learned value Pr is learned under prescribed conditions after the ignition is turned on and stored in the nonvolatile memory 57. The stroke counter value Sg represents the axial position of the control shaft 16 with reference to the state in which the control shaft 16 is moved to the limit of movement corresponding to the distal end 16b. In other words, the stroke counter value Sg represents the motor rotational angle $\theta$ with reference to the limit of movement of the set angular range of the brushless motor 47.

The motor control device 50 detects the motor rotational angle $\theta$ based on the stroke counter value Sg. To control the valve actuation parameters of the intake valve 9 by operating the variable valve mechanism 14, the motor control device 50 operates the brushless motor 47 in such a manner that the detection value $\theta$d of the motor rotational angle $\theta$ becomes a value corresponding to the target valve actuation parameters commanded by the engine control device 51. As a result, the valve actuation parameters of the intake valve 9 are precisely controlled to achieve the target.

The motor control device 50 stores the position counter value Pg in the nonvolatile memory 57 before the position counter value Pg is reset to 0 when the ignition is turned off. Then, after the ignition is turned on, the motor control device 50 reads out the position counter value Pg from the nonvolatile memory 57 and resumes counting the position counter value Pg. After the engine 1 is restarted, the stroke counter value Sg, which is set in correspondence with the position counter value Pg, corresponds to the motor rotational angle $\theta$.

For example, if the position counter value Pg remains 0 after counting of the position counter value Pg is resumed, the stroke counter value Sg, which is set in correspondence with the position counter value Pg, may not correspond to the motor rotational angle $\theta$. However, this problem is solved by the present embodiment.

However, the motor rotational angle $\theta$ may change due to mechanical looseness in the period from when the ignition is turned off to stop the engine to when the ignition is turned on to restart the engine. In this case, the motor rotational angle $\theta$ at the time when the engine is restarted does not correspond to the position counter value Pg, which was stored when the engine was stopped. That is, the position counter value Pg, counting of which is resumed after the engine is restarted, may be displaced from the value corresponding to the motor rotational angle $\theta$.

With reference to FIG. 3(g), if, for example, the ignition is turned off when the position counter value Pg is 29, the position counter value Pg of 29 is stored in the nonvolatile memory 57. Assume that the actual value $\theta$r of the motor rotational angle $\theta$ is changed by the amount of −13 in the reverse rotational direction (leftward as viewed in FIG. 3) due to the influence of the mechanical looseness on the brushless motor 47 in the period in which the engine is maintained in a stopped state, as indicated by the arrow AR in FIG. 3(g). That is, assume that the position counter value Pg of 29 corresponding to the detection value $\theta$d of the motor rotational angle $\theta$ does not coincide with the actual value $\theta$r of 16 of the motor rotational angle $\theta$. In this case, the position counter value Pg of 29 is greater than the value 16 corresponding to the actual value $\theta$r of the motor rotational angle $\theta$ by the difference of 13.

For example, if the position counter value Pg of 29 is set to the initial value of the position counter value Pg when the ignition is turned on, the stroke counter value Sg, which is set in correspondence with the position counter value Pg, does not correspond to the actual value $\theta$r of the motor rotational angle $\theta$. In this case, with reference to FIG. 3(h), the stroke counter value Sg may be 344, which is greater than 331, the value corresponding to the actual axial position of the control shaft 16, by the difference of 13. The detection value $\theta$d of the motor rotational angle $\theta$ obtained in correspondence with the stroke counter value Sg of 344 does not represent the actual value $\theta$r, or is inaccurate. When, as in this case, the detection value θd of the motor rotational angle θ is inaccurate, it is impossible to accurately control the brushless motor 47 in such a manner that the valve actuation parameters of the intake valve 9 achieve the target actuation parameters. This may disadvantageously influence operation of the engine 1.

(Stop/Start Counting Procedure)

To solve this problem, the motor control device 50 of the present embodiment operates in such a manner that the position counter value Pg at the time when the ignition is turned on corresponds to the actual value θr of the motor rotational angle θ by carrying out the stop/start counting procedure. The stop/start counting procedure, or a stop/start position counting procedure, includes the following procedures, such as a first procedure PR1, a second procedure PR2, and a third procedure PR3. In the first to third procedures PR1 to PR3, the correction value ΔP in step S103 of FIG. 4 is calculated in such a manner that the detection position counter value Pk corresponds to the actual value θr of the motor rotational angle θ. As a result, the motor control device 50 acquires the actual value θr of the motor rotational angle θ, which has changed in the period from when the ignition is turned off to when the ignition is turned on.

(First Procedure PR1)

In the first procedure PR1, the motor control device 50 calculates a first counter value Eg and a second counter value Ei. The first counter value Eg is an electric angle counter value at the time when the ignition is turned off and the second counter value Ei is an electric angle counter value at the time when the ignition is turned on for the first time after the ignition is turned off. In other words, the first counter value Eg represents the electric angle counter value at the time immediately before the power supply to the motor control device 50 is stopped. The second counter value Ei represents the electric angle counter value at the time immediately after the power supply to the motor control device 50 is started.

The second counter value Ei is obtained when the ignition is turned on. Specifically, the electric angle counter value Ec varies in correspondence with the output pattern of the first to third electric angle sensors S1 to S3 and is determined in correspondence with the output pattern even immediately after the ignition is turned on. The second counter value Ei is stored in the nonvolatile memory 57 whenever the ignition is turned on.

Also in the first procedure PR1, the motor control device 50 calculates a change equivalent value X using the equation (1), which will be described later. The change equivalent value X is a change of the position counter value Pg converted from the change of the actual value θr of the motor rotational angle θ that is caused in the period in which the engine is held in a stopped state.

(Second Procedure PR2)

In the second procedure PR2, the motor control device 50 calculates the correction value ΔP. The correction value ΔP is used to correct the current position counter value Pg stored in the nonvolatile memory 57. In other words, the position counter value Pg is corrected using the correction value ΔP in such a manner that the position counter value Pg corresponds to the actual value θr of the motor rotational angle θ. The correction value ΔP is obtained by the following equation: ΔP=X−Pg. In other words, the correction value ΔP is the difference between the change equivalent value X and the current position counter value Pg. In the example of FIG. 3, the change equivalent value X is 13, the current position counter value Pg is 29, and the corrected position counter value Pg is 16.

(Third Procedure PR3)

In the third procedure PR3, the motor control device 50 corrects the position counter value Pg when the ignition is turned on. That is, when the ignition is turned on, the correction value ΔP is added to the position counter value Pg, which was reset to 0 when the ignition was turned off. The corrected position counter value Pg is set as the detection position counter value Pk, using which the motor rotational angle θ is detected. The detection position counter value Pk is set in step S103 of FIG. 4.

By performing the first to third procedures PR1 to PR3, the detection position counter value Pk is changed by the amount corresponding to the correction value ΔP with respect to the position counter P at the time when the ignition has been turned on. Accordingly, the detection position counter value Pk corresponds to the actual value θr of the motor rotational angle θ. The motor rotational angle θ is accurately detected based on the stroke counter value Sg, which is set in accordance with the detection position counter value Pk.

The following is the equation (1) in the first procedure PR1:

$$X=(Eg-Ei) \cdot n + \text{(the remainder when } Pg \text{ is divided by } n\text{)} \qquad (1)$$

In the equation (1), n represents the number of edges of a pulse signal. The number of edges n represents the number of the pulse signals output by the first and second position sensors S4, S5 in the interval between the edges of the pulse signals of the first to third electric angle sensors S1 to S3. In the present embodiment, the number of edges n=4. The term (Eg−Ei)·n of the equation (1) is a position counter value Pg converted from the difference between the first counter value Eg and the second counter value Ei. If the position counter value Pg at the time when the ignition has been turned off is a value at the time when an edge occurs in the pulse signal of any one of the first to third electric angle sensors S1 to S3, that is, for example, the position counter value Pg is 28, the term (Eg−Ei)·n is employed as the change equivalent value X without being changed.

If the position counter value Pg is not a value at the time when an edge occurs in the pulse signal of any one of the first to third electric angle sensors S1 to S3, which is, for example, 28, the term (Eg−Ei)·n is displaced from the accurate change equivalent value X by the amount corresponding to the difference between the position counter value Pg and the value at the occurrence of the edge. If the position counter value Pg is 29 as in the example of FIG. 3, the difference between the position counter value Pg and the value at the edge 28 is 1. In this case, the term (Eg−Ei)·n is displaced from the accurate change equivalent value X by the amount corresponding to the difference 1. The difference between the term (Eg−Ei)·n and the accurate change equivalent value X coincides with the remainder AR when the position counter value Pg at the time when the ignition has been turned off is divided by the number of edges n, 4. Accordingly, the change equivalent value X is accurately obtained by adding the remainder AR to the term (Eg−Ei)·n, as represented by the equation (1).

Figure 6:
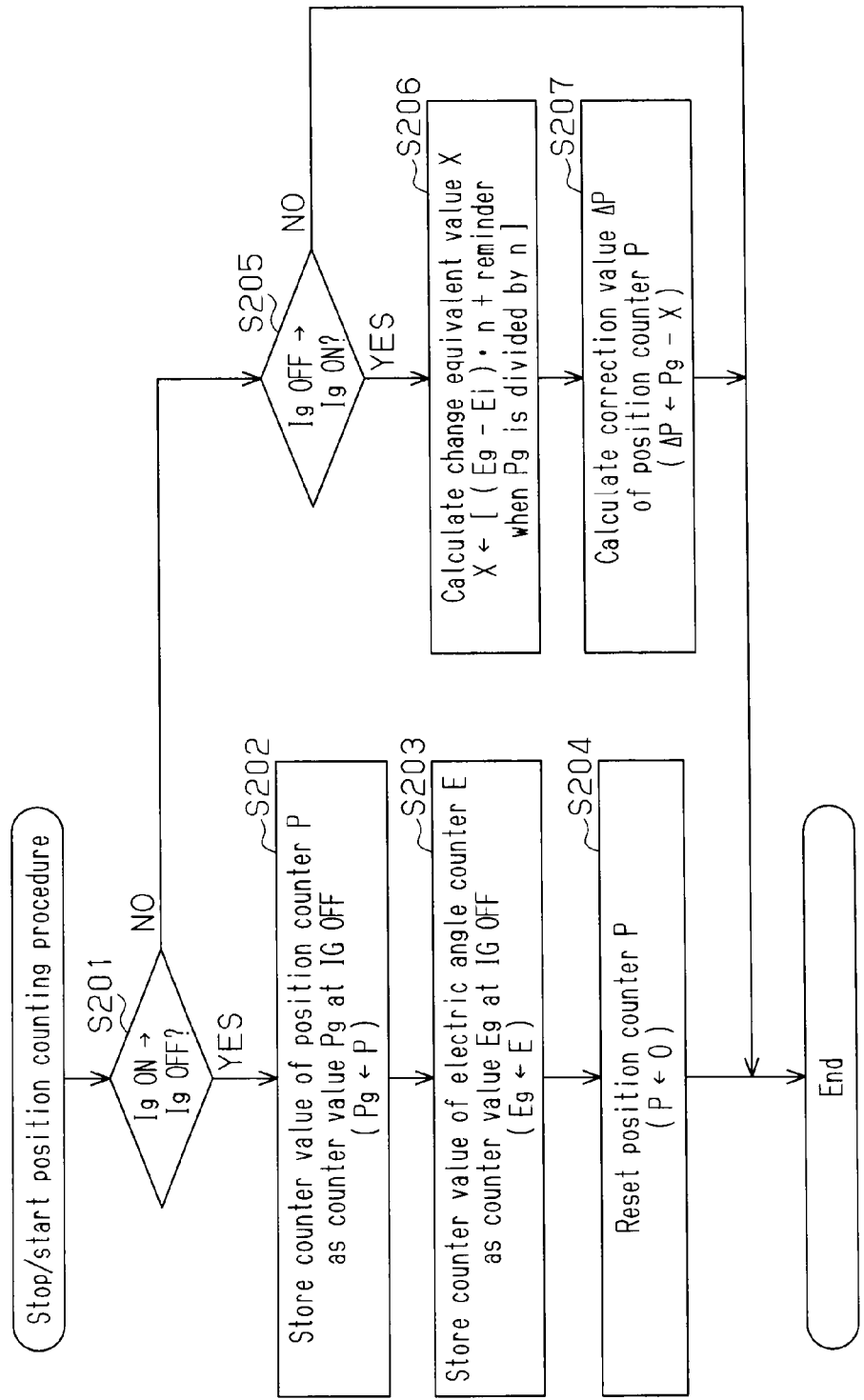
FIG. 6 is a flowchart representing a stop/start counting procedure performed by the motor control device 50 of FIG. 2.

FIG. 6 represents a procedure of the position counter P carried out when the ignition switch 56 is turned off or on. The motor control device 50 performs the stop/start counting procedure by a cycle shorter than the interval between the edges of the pulse signals of the first and second position sensors S4, S5. The motor control device 50, which carries out the stop/start counting procedure, configures a calculating portion.

In the stop/start counting procedure, the motor control device 50 determines whether the current point of time is a point immediately after the ignition switch 56 has been switched off from an ON state in step S201. If positive determination is made in step S201, the nonvolatile memory 57 stores the position counter value Pg as the position counter value Pg at the time when the ignition is turned off. Step S203 is then carried out.

In step S203, the nonvolatile memory 57 stores the electric angle counter value Ec as the first counter value Eg. Then, in step S204, the motor control device 50 resets the position counter P to 0 and ends the stop/start counting procedure.

If the determination of step S201 is negative, the motor control device 50 determines whether the current point of time is a point immediately after the ignition switch 56 has been turned on from an OFF state in step S205. If the determination of step S205 is positive, the motor control device 50 calculates the change equivalent value X by performing the first procedure PR1 in step S206 and the correction value ΔP by carrying out the second procedure PR2 in step S207. The stop/start counting procedure is then ended.

(Position Counter Learning Procedure)

Figure 7:
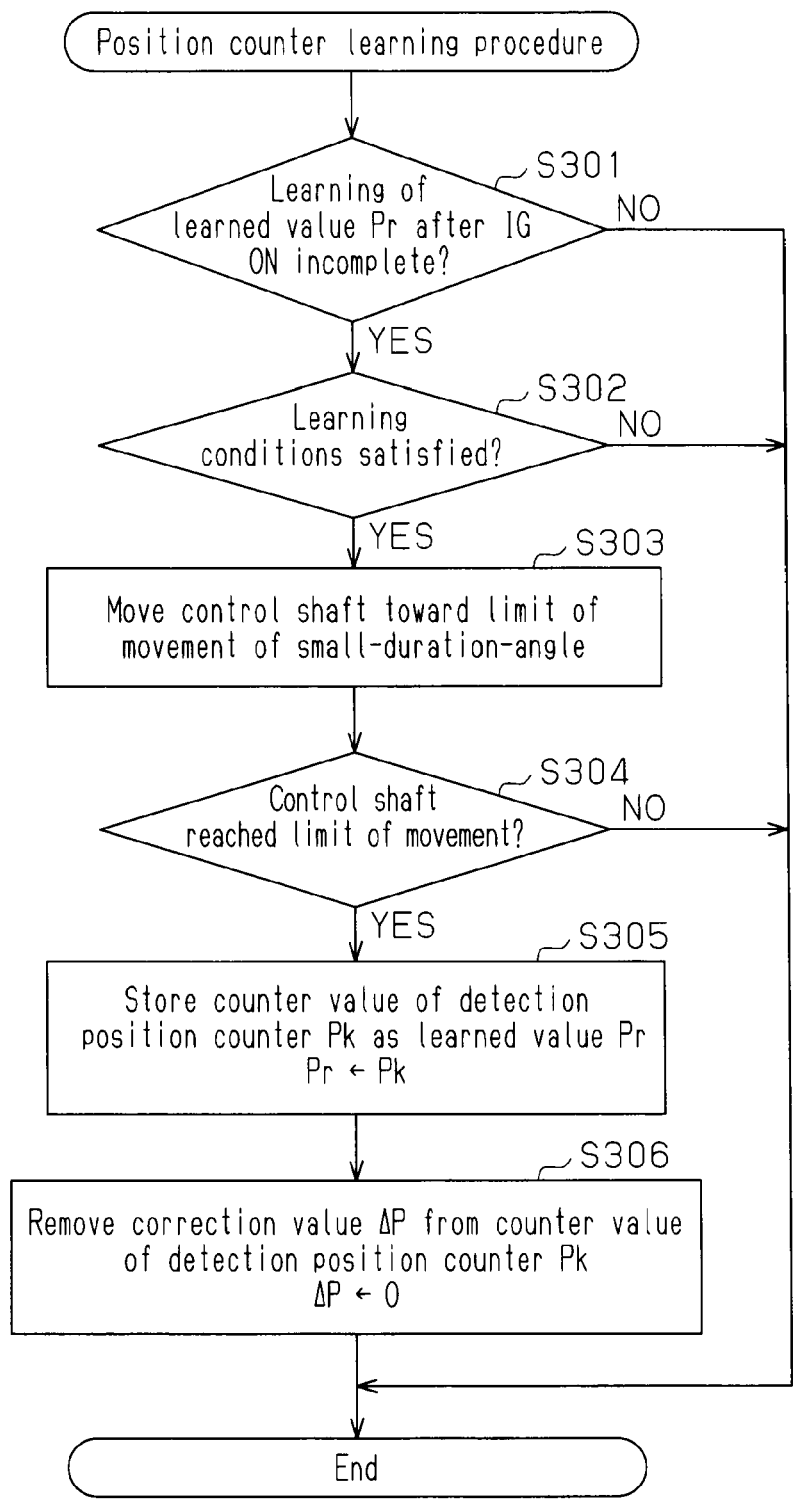
FIG. 7 is a flowchart representing a position counter learning procedure performed by the motor control device 50 of FIG. 2.

The flowchart of FIG. 7 represents a position counter learning procedure. Specifically, the flowchart represents a learning procedure of the learned value Pr, or an initial position learning procedure, and a procedure for removing, or subtracting, the correction value ΔP from the detection position counter value Pk after the learned value Pr is learned. The motor control device 50 performs the position counter learning procedure by a cycle shorter than the interval between the edges of the pulse signals of the first and second position sensors S4, S5.

In the position counter learning procedure, the motor control device 50 performs step S303 to learn the learned value Pr if learning of the learned value Pr after the ignition has been turned on is incomplete, that is, if the determination of step S301 is positive and the determination of step S302 is positive. In other words, the motor control device 50 carries out step 303 to learn the learned value Pr if any learned value Pr has not been written in the nonvolatile memory 57 after the ignition was turned on and conditions for learning are met.

One of the conditions for learning in step S302 is that the engine 1 is in a fuel cut-off control. Specifically, the engine 1 being in the fuel cut-off control reduces the influence of movement of the control shaft 16, which is moved to the limit of movement, on the operating state of the engine 1. This is advantageous for learning the learned value Pr.

First, in step S303, the motor control device 50 moves the control shaft 16 to the limit of movement corresponding to the distal end 16b. In other words, the motor rotational angle θ is moved to the limit of movement of the set angular range.

Then, in step S304, the motor control device 50 determines whether the control shaft 16 has reached the limit of movement based on whether, for example, change of the position counter P is not to happen any more. When positive determination is made in step S304, or it is determined that the control shaft 16 has reached the limit of movement, the motor control device 50 stores the detection position counter value Pk in this state in the nonvolatile memory 57 as the learned value Pr. This completes learning of the learned value Pr.

The learned value Pr stored in the nonvolatile memory 57 is added, with a reversed sign, to the detection position counter value Pk in step S104 of FIG. 4. The sum is set as the stroke counter value Sg. After the ignition is turned on, the learned value Pr is learned when the detection position counter value Pk corresponds to the addition of the correction value ΔP and the counter value of the position counter P. Accordingly, when the learned value Pr, which is stored in the nonvolatile memory 57 as a learned result, is reflected in the counter value of the stroke counter S, the stroke counter value Sg reflects the correction value ΔP. However, once the learned value Pr is learned, or stored in the nonvolatile memory 57, the correction value ΔP included in the detection position counter value Pk is unnecessary. Specifically, when the correction value ΔP is included in the detection position counter value Pk, the stroke counter value Sg, which is set based on this count, is inappropriate. This causes inaccuracy in the detection value θd of the motor rotational angle θ, which is based on the stroke counter value Sg.

To avoid this problem, in the position counter learning procedure, the motor control device 50 sets the correction value ΔP to 0 in step S306 after the learning of the learned value Pr of steps S303 to S305 is completed. As a result, the correction value ΔP is subtracted from the detection position counter value Pk and the above-described problem is avoided.

(Displacement Determination Procedure)

When the engine 1 operates, a movable portion of the variable valve mechanism 14, such as the control shaft 16, may be displaced unexpectedly due to mechanical instability or by receiving reactive force from the valve spring 24. In this case, the actual value θr of the motor rotational angle θ does not coincide with the detection value θd. To solve this problem, in the present embodiment, the engine control device 51 performs a displacement determination procedure when it is highly likely that the actual value θr of the motor rotational angle θ changes unexpectedly, that is, when the engine 1 is operating and the motor control device 50 is not being powered. In the displacement determination procedure, the engine control device 51 determines whether the detection value θd of the motor rotational angle θ is displaced from the actual value θr.

Figure 8:
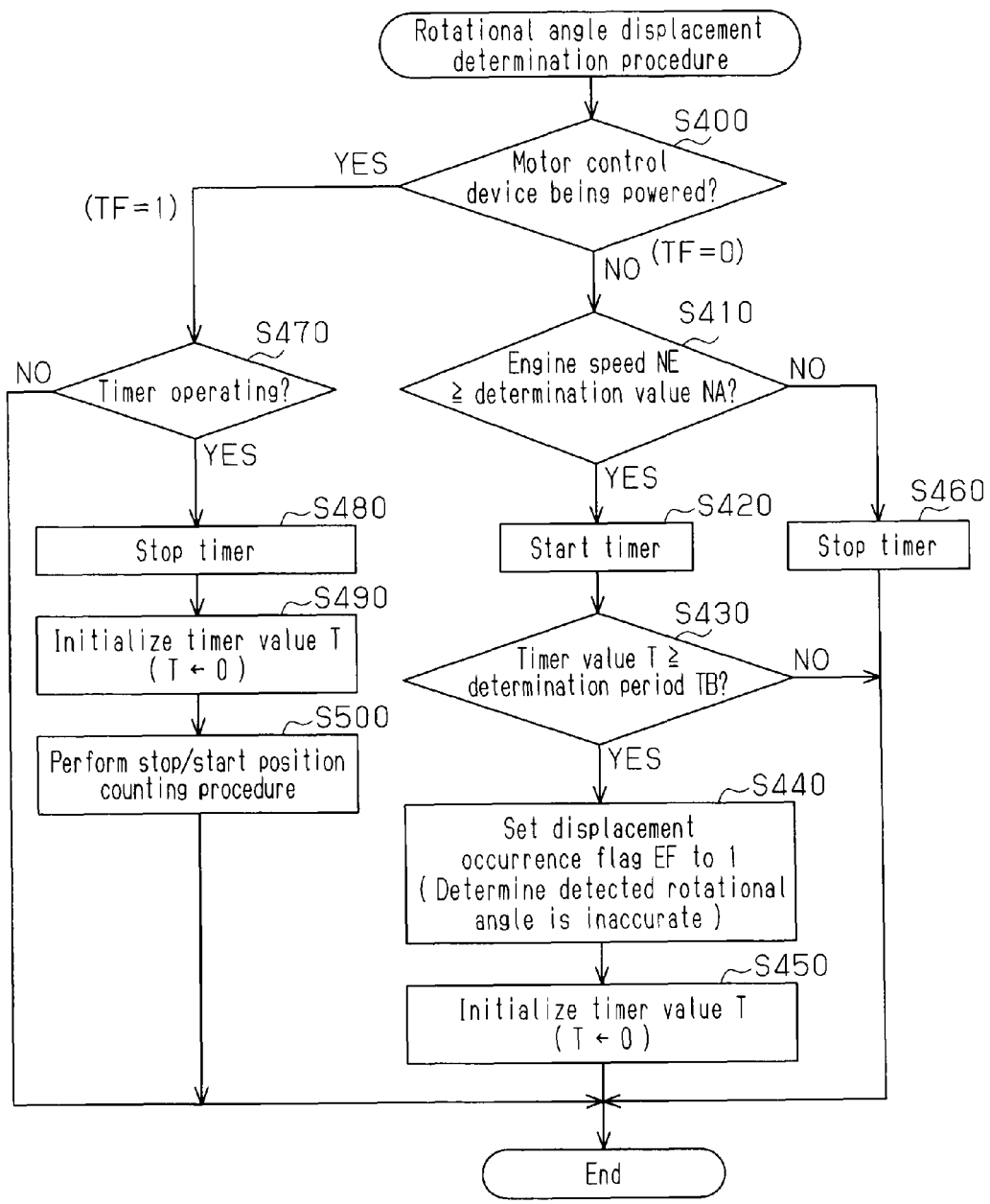
FIG. 8 is a flowchart representing a displacement determination procedure for the motor rotational angle θ performed by the engine control device 51 illustrated in FIG. 2.

FIG. 8 represents the flowchart of the displacement determination procedure. The engine control device 51, which performs this procedure cyclically, configures a determining portion.

In the displacement determination procedure, the engine control device 51 determines whether the motor control device 50 is being powered in step S400.

The engine control device 51 determines whether the motor control device 50 is in a non-powered state by determining whether mutual communication between the motor control device 50 and the engine control device 51 is disabled. If the determination of step S400 is negative, that is, if the motor control device 50 is in the non-powered state, the engine control device 51 switches a communication disruption flag TF to 1 and performs step S410. If the determination of step S400 is positive, that is, if the motor control device 50 is in a powered state, the engine control device 51 switches the communication disruption flag TF to 0.

In step S410, the engine control device 51 determines whether the current engine speed NE is higher than or equal to a threshold value NA. If the determination of step S410 is positive, that is, if the engine speed NE is higher than or equal to the threshold value NA, the engine control device 51 carries out step S420 and starts the timer 58.

If the determination of step S410 is negative, that is, if the engine speed NE is less than the threshold value NA, the engine control device 51 performs step S460 and stops the timer 58. Specifically, after the timer 58 is switched from the operating state to the stopped state, the timer 58 maintains the current timer value T. If the timer 58 has been held in the stopped state, the timer 58 is maintained in this state. Afterwards, the engine control device 51 suspends the displacement determination procedure.

When positive determination is made in step S410, that is, when the engine speed NE is higher than or equal to the threshold value NA, the engine control device 51 carries out step S420 and starts the timer 58. The engine control device 51 then performs step S430. The timer 58, which has been stopped in step 460 in the previous cycle, is restarted. Counting of the timer value T is resumed from the counter value maintained in step S460. Specifically, the timer value T represents the accumulated time of the periods in which the motor control device 50 is in the non-powered state and the engine speed NE is higher than or equal to the threshold value NA. The engine control device 51, which performs steps S410, S420, and S460 and the timer 58 each configure a measuring portion.

Figure 9:
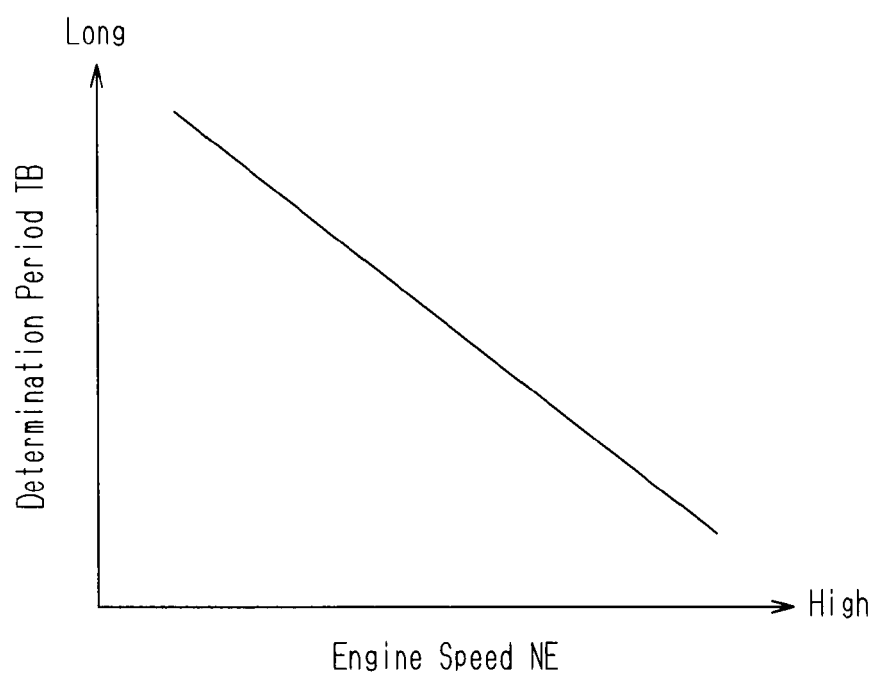
FIG. 9 is a graph representing the relationship between a determination period TB and an engine speed NE, which is used in step S430 of FIG. 8.

In step S430, the engine control device 51 determines whether the timer value T is greater than or equal to a determination period TB. The determination period TB is set to a time longer than one cycle of the electric angle counter E. The cycle of the electric angle counter E represents one cycle of the electric angle counter value Ec, which is 0→1→2→3→4→5. As illustrated in FIG. 9, the determination period TB becomes shorter as the engine speed NE becomes higher. The determination period TB is set in this manner since it is assumed that, when the engine 1 is operating and the motor control device 50 is in the non-powered state, likeliness that the actual value θr of the motor rotational angle θ increases becomes greater as the engine speed NE becomes higher.

If the determination of step S430 is negative, that is, if the timer value T is less than the determination period TB, the engine control device 51 suspends the displacement determination procedure.

If the determination of step S430 is positive, that i, if the timer value T is greater than or equal to the determination period TB, the engine control device 51 performs step S440 and switches the displacement occurrence flag EF to 1. The engine control device 51 then carries out step S450, or initializes the timer value T to 0, and suspends the displacement determination procedure.

The determination of step S440 is based on the following two facts:

that it is considered definite that the engine 1 is operating when the period in which the engine speed NE is higher than or equal to the threshold value NA is long to a certain extent; and that it is considered that the detection value θr of the motor rotational angle θ is displaced from the actual value θr if the motor control device 50 is in the non-powered state when it is determined that the engine 1 is operating.

After detecting that the displacement occurrence flag EF is 1, the motor control device 50, which is in the powered state, performs the position counter learning procedure of FIG. 7. As a result, the motor control device 50 causes the detection result θd of the motor rotational angle θ to be equal to the actual value θr.

When the determination of step S400 is positive, the engine control device 51 proceeds to step S470, and determines whether the timer 58 is operating. If the determination of step S470 is negative, that is, if the timer 58 is stopped, the engine control device 51 suspends the displacement determination procedure.

If the determination of step S470 is positive, that is, if the timer 58 is operating, the engine control device 51 carries out step 480 and stops the timer 58. The engine control device 51 then performs step S490 to initialize the timer value T to 0. Then, in step S500, the engine control device 51 operates the motor control device 50 to perform the stop/start counting procedure of FIG. 6 when the motor control device 50 is switched to the powered state. Afterwards, the engine control device 51 suspends the displacement determination procedure.

FIG. 10 represents the result of the displacement determination procedure when the engine speed NE stably increases after the engine 1 has been started.

Basically, the power supply to the engine control device 51 and the motor control device 50 is started when the ignition is turned on. In other words, the communication disruption flag TF is maintained as 0. However, in the case of FIG. 10, since the motor control device 50 is maintained in the non-powered state after the ignition is turned on, the determination of step S400 is negative at time point t1. The communication disruption flag TF is switched from 0 to 1.

When the engine speed NE becomes higher than or equal to the threshold value NA at time point t2 after the starting motor is actuated and the engine 1 is started, positive determination is made in step S410 and the timer 58 is started in step S430. In the case of FIG. 10, the timer value T continuously increases since the engine speed NE is maintained as a value higher than the threshold value NA after time point t2.

When the timer value T reaches the determination period TB at time point t3, positive determination is caused in step S430 and the displacement occurrence flag EF is switched from 0 to 1 in step S440. In other words, the engine control device 51 determines that the actual value θr of the motor rotational angle θ is displaced from the detection value θd. Afterwards, when the motor control device 50 is switched to the powered state, the motor control device 50 performs the position counter learning procedure, so that the detection value θd of the motor rotational angle θ coincides with the actual value θr.

As indicated by the single-dotted chain lines in FIG. 10, when the motor control device 50 is switched from the non-powered state to the powered state in the period from time point t2 to time point t3, positive determination is made in step S4400 and then in step S470. Subsequently, in step S480, the engine control device 51 initializes the timer value T to 0. Afterwards, when the motor control device 50 is switched to the powered state, the motor control device 50 carries out the stop/start counting procedure, and to cause the detection value θd of the motor rotational angle θ to be equal to the actual value θr.

FIG. 11 represents the result of the displacement determination procedure when the engine speed NE increases while unstably fluctuating after the engine 1 is started. Specifically, the engine speed NE repeatedly exceeds and falls short of the threshold value NA. When the engine speed NE becomes higher than or equal to the threshold value NA for the first time after the starting motor is actuated, the engine control device 51 starts the timer 58 and increases the timer value T. When the engine speed NE becomes less than the threshold value NA at time point t2, the engine control device 51 temporarily stops the timer 58. The timer 58 maintains the timer value T that has been counted immediately before stopping of the timer 58. When the engine speed NE recovers a level higher than or equal to the threshold value NA at time point t3, the timer 58 starts operating and increases the timer value T from the maintained value. When the timer value T reaches the determination period TB at time point t4 after operation of the timer 58 is repeatedly started and suspended, the displacement occurrence flag EF is switched from 0 to 1. Afterwards, when the motor control device 50 is switched to the powered state, the motor control device 50 performs the position counter learning procedure to cause the detection value θd of the motor rotational angle θ to be equal to the actual value θr.

Although not illustrated in FIG. 11, when the motor control device 50 is switched to the powered state before time point t4 as in the case of FIG. 10, or the motor control device 50 is switched to the powered state before the timer value T reaches the determination period TB, the timer value T is initialized. Afterwards, when the motor control device 50 is switched to the powered state, the motor control device 50 performs the stop/start counting procedure to cause the detection result θd of the motor rotational angle θ to equal to the actual value θr.

As has been described, the determination period TB of the present embodiment is set to a time longer than one cycle of the electric angle counter E. Accordingly, when the second counter value Ei is a value within one cycle from the first counter value Eg, the difference between the detection value θd and the actual value θr of the motor rotational angle θ is obtained appropriately through the stop/start counting procedure. When the second counter value Ei is a value exceeding the cycle from the first counter value Eg, it is determined that the detection value θd of the motor rotational angle θ is displaced from the actual value θr through the displacement determination procedure. Accordingly, even if inappropriate calculation of the change equivalent value X in the stop/start counting procedure causes displacement of the detection value θd of the motor rotational angle θ with respect to the actual value θr, such displacement is detected.

The engine speed NE is measured, the engine speed NE is compared with the threshold value NA, and the period in which the engine speed NE exceeds the threshold value NA is measured generally by a relatively simple structure. In the present embodiment, the period in which the engine speed NE exceeds the threshold value NA is measured as the timer value T and, when the timer value T is greater than or equal to the determination period TB, it is determined that the engine 1 is operating. Specifically, if the non-powered state of the motor control device 50 is detected when the engine control device 51 determines that the engine 1 is operating, the engine control device 51 determines that the detection value θd of the motor rotational angle θ is displaced from the actual value θr. Accordingly, the engine control device 51 is capable of determining whether the detection value θd of the motor rotational angle θ is displaced from the actual value θr appropriately and by a simple structure.

The present embodiment has the following advantages.

(1) The engine control device 51 detects the powered state of the motor control device 50 and the operating state of the engine 1. When the engine control device 51 detects that the engine 1 is in the operating state and the motor control device 50 is in the non-powered state, the engine control device 51 determines that the detection value θd of the motor rotational angle θ is displaced from the actual value θr. That is, the engine control device 51 effectively determines that the detection value θd of the motor rotational angle θ of the brushless motor 47, which drives the variable valve mechanism 14, is displaced from the actual value θr.

(2) The engine control device 51 counts the timer value T, which is the accumulated time of the periods in which the engine speed NE exceeds the threshold value NA, which is set in advance. When the engine control device 51 detects that the timer value T is greater than or equal to the determination period TB and the motor control device 50 is in the non-powered state, the engine control device 51 determines that the detection value θd of the motor rotational angle θ is displaced from the actual value θr. Accordingly, determination whether the detection value θd of the motor rotational angle θ is displaced from the actual value θr is carried out appropriately and by a simple structure.

(3) Even when the engine speed NE is unstable as in the state in which the engine 1 is being started, the engine control device 51 obtains the sum of the time in which the engine speed NE exceeds the threshold value NA as the timer value T. This allows the engine control device 51 to appropriately determine whether the detection value θd of the motor rotational angle θ is displaced from the actual value θr, even if the engine speed NE rises unstably.

(4) The engine control device 51 sets the determination period TB to a shorter time as the engine speed NE becomes higher. This allows the engine control device 51 to appropriately set the time needed for the displacement determination procedure.

(5) The engine control device 51 is connected to the motor control device 50 through the communication cable 60, which allows mutual communication between the engine control device 51 and the motor control device 50. The engine control device 51 determines that the motor control device 50 is in the non-powered state by detecting disruption of the mutual communication. This allows the engine control device 51 to appropriately determine that the motor control device 50 is in the non-powered state.

(6) When the engine control device 51 determines that the detection value θd of the motor rotational angle θ is displaced from the actual value θr, that is, when the determination of step S430 is positive, the engine control device 51 operates the motor control device 50, which is in the powered state, to perform the initial position learning procedure, that is, to perform the position counter learning procedure, of FIG. 7. The motor control device 50, which is in the powered state, actuates the brushless motor 47 to change the motor rotational angle θ to the limit of movement of the set angular range and stores the position counter value Sg in this state as the initial position. This corrects the displacement of the detection value θd of the motor rotational angle θ with respect to the actual value θr.

(7) The motor control device 50 carries out the stop/start counting procedure of FIG. 6 when the ignition is turned off and when the ignition is turned on. Accordingly, even if the motor rotational angle θ is changed in the period in which the engine 1 is held in the stopped state, the motor control device 50 corrects the detection position counter value Pk when the ignition is turned on, in such a manner that the detection position counter value Pk corresponds to the actual value θr of the motor rotational angle θ. This allows the motor control device 50 to accurately detect the motor rotational angle θ based on the stroke counter value Sg, which is set based on the detection position counter value Pk. In this manner, the following disadvantage is avoided. Specifically, it is possible to avoid inaccurate control of the brushless motor 47 when the brushless motor 47 should be controlled to achieve the target valve actuation parameters based on the motor rotational angle θ, which undesirably influences operation of the engine 1.

If the engine control device 51 does not determine that displacement has occurred in the displacement determination procedure, the motor control device 50 performs the stop/start counting procedure, as represented in step 500 of FIG. 8, when the motor control device 50 is switched from the non-powered state to the powered state. This allows the motor control device 50 to detect a change in the motor rotational angle θ when the engine 1 is maintained in the stopped state.

The motor rotational angle θ that changes in the period from when the engine has been started to when the power supply to the motor control device 50 is started is calculated based on the first counter value Eg and the second counter value Ei. Accordingly, even if the power supply to the motor control device 50 is temporarily suspended while the engine 1 is being started, the motor rotational angle θ that changes in the period from when the power supply to the motor control device 50 has been blocked to when such power supply is resumed is obtained when the motor control device 50 is switched to the powered state later.

As a result, the following problem is solved by the stop/start counting procedure. Specifically, when the engine 1 starts, a drop in the battery voltage or temporary disconnection of the power cable feeding the motor control device 50 may cause the non-powered state of the motor control device 50, which detects the counter value of the position counter P. When in the non-powered state, the motor control device 50 cannot calculate the position counter value Pg. Accordingly, if the actual value θr of the motor rotational angle θ changes when the motor control device 50 is held in the non-powered state, the change of the motor rotational angle θ is not reflected in the count. In this case, when the power supply to the motor control device 50 is resumed and the motor rotational angle θ is detected, the detection value θr of the motor rotational angle θ, or the position counter value Pg, is displaced from the actual value θr. This prevents the motor control device 50 to accurately detect the current valve actuation parameters. However, this problem is solved by the stop/start counting procedure of the present embodiment.

(8) As represented in step S206 of FIG. 6, the change equivalent value X is calculated by the stop/start counting procedure using the following equation.

$$X=(Eg-Ei)\cdot n+\text{(the remainder when } Pg \text{ is divided by } n\text{)} \quad \text{Equation (1)}$$

The term $(Eg-Ei)\cdot n$ of the equation (1) is a position counter value Pg converted from the difference between the first counter value Eg, or the electric angle counter value at the time when the ignition has been turned off, and the second counter value Ei, which is obtained later when the ignition is turned on. When the position counter value Pg is not the value at which an edge occurs in the pulse signal of any one of the first to third electric angle sensors S1 to S3, the term $(Eg-Ei)\cdot n$ is displaced from the accurate change equivalent value X by the amount equal to the difference between the position counter value Pg and the value at the edge. The difference between the term $(Eg-Ei)\cdot n$ and the accurate change equivalent value X coincides with the remainder AR when the position counter value Pg at the time when the ignition has been turned off is divided by the number of edges n. Accordingly, by adding the remainder AR to the term $(Eg-Ei)\cdot n$ as indicated by the equation (1), the accurate change equivalent value X is determined.

(9) As represented in step S206 of FIG. 6, in the stop/start counting procedure, the change equivalent value X is calculated based on the second counter value Ei obtained when the ignition is turned on, and the first counter value Eg, which was obtained when the ignition was turned off. The electric angle counter value Ec, which is used to switch the energizing phases of the brushless motor 47, changes cyclically. Accordingly, the second counter value Ei may be either a value within one cycle from the first counter value Eg or a value exceeding the cycle. When the second counter value Ei exceeds the cycle from the first counter value Eg, the change equivalent value X obtained through calculation may be an error.

To solve this problem, the determination period TB with which the displacement determination procedure of the present embodiment is carried out is set to a time longer than the cycle of the electric angle counter E. Accordingly, when the second counter value Ei is the value exceeding the cycle from the first counter value Eg, it is determined by the stop/start counting procedure whether the detection value θd of the motor rotational angle θ is displaced from the actual value θr. As a result, even when the motor control device 50, which performs the stop/start counting procedure, cannot calculate the change equivalent value X appropriately, the engine control device 51 of the present embodiment is capable of appropriately determining whether the detection value θd of the motor rotational angle θ is displaced from the actual value θr.

When the second counter value Ei is the value within the cycle from the first counter value Eg, the motor control device 50, which performs the stop/start counting procedure, appropriately determines the difference between the detection value θd of the motor rotational angle θ and the actual value θr.

(10) After the ignition is turned off, the control shaft 16 is moved to the limit of movement corresponding to the distal end 16b and the detection position counter value Pk in this state is stored in the nonvolatile memory 57 as the learned value Pr. This completes learning of the learned value Pr. After such learning, the learned value Pr is added, with a reversed sign, to the counter value of the stroke counter S, that is, in a direct sense, to the detection position counter value Pk. In this state, the stroke counter value Sg reflects the correction value ΔP. However, after learning of the learned value Pr, the correction value ΔP included in the detection position counter value Pk is unnecessary. Accordingly, if the stroke counter S were set based on the detection position counter value Pk that includes the correction value ΔP, the stroke counter S would be inappropriate. In this case, the actual value θr of the motor rotational angle θ calculated with the inappropriate stroke counter value Sg would be inaccurate.

To solve this problem, the motor control device 50 of the present embodiment sets the correction value ΔP to 0 after the learned value Pr is learned. Specifically, the motor control device 50 subtracts the correction value ΔP from the detection position counter value Pk after learning of the learned value Pr. As a result, the above-described problem is solved.

The present embodiment may be modified into the following forms.

A control device of the variable valve mechanism 14 does not necessarily have to perform both the stop/start counting procedure and the displacement determination procedure but may carry out only the displacement determination procedure without performing the stop/start counting procedure. Also in this case, the engine control device 51 detects that the motor control device 50 is in the powered state and the engine 1 is in the operating state. When the engine control device 51 detects that the engine 1 is in the operating state and the motor control device 50 is in the non-powered state, the engine control device 51 determines that the detection value θd of the motor rotational angle θ is displaced from the actual value θr. In this case, the engine control device 51 performs the displacement determination procedure even when a motor other than the brushless motor 47 drives the variable valve mechanism 14. Further, if the stop/start counting procedure is not carried out, the determination period TB may be shortened. Alternatively, if the stop/start counting procedure is not performed, the timer 58 may be omitted. In other words, measurement of the time in which the engine speed NE is higher than or equal to the threshold value NA may be omitted. For example, the engine control device 51 may switch the displacement occurrence flag EF to 1 when it is detected that the engine speed NE is higher than 0 and the motor control device 50 is in the non-powered state.

The displacement determination procedure does not necessarily have to be carried out by the engine control device 51 but may be performed by a device other than the engine control device 51, which is provided specifically for the displacement determination procedure.

The period in which the engine speed NE is higher than or equal to the threshold value NA does not necessarily have to be measured by the timer 58. Specifically, a counter may be employed. The counter increments its count by a predetermined value, such as 1, when the determination of step S400 of FIG. 8 is negative and the determination of step S410 is positive. Based on the value of this counter, the period in which the engine speed NE is higher than or equal to the threshold value NA may be measured.

The determination period TB may be set in a manner different from the manner represented in FIG. 9. Specifically, the determination period TB is not restricted to setting in correspondence with the engine speed NE but may be a constant value.

Determination whether the motor control device 50 is in the non-powered state is not restricted to determination based on whether mutual communication between the motor control device 50 and the engine control device 51 is disrupted.

If the motor control device 50 is in the non-powered state after starting of the engine 1 is completed and the engine 1 is switched to normal operation, the detection value θd of the motor rotational angle θ may become displaced from the actual value θr. However, the displacement determination procedure is repeatedly performed in a cyclic manner. This allows the engine control device 51 to appropriately detect displacement in the motor rotational angle θ not only when the engine 1 starts but after the engine 1 is switched to the normal operation.

The integer value m of the electric angle counter value Ec is not restricted to 5. If the integer value m is altered, the number and the positions of the electric angle sensors and the number of the poles of the multipole magnet, which is the detection target of the electric angle sensors, are changed as needed.

The number of edges n is not restricted to 4. The number of edges n may be changed to an integer value greater than or equal to 2, as long as the detection accuracy of the motor rotational angle θ is ensured. If the number of edges n is altered, the number and the positions of the position counters and the number of the poles of the multipole magnet, which is the detection target of the position sensors, are changed as needed.

The first and second position sensors S4, S5 are not restricted to the magnetic sensors but may be, for example, optical sensors. For example, a disk with a slit may be formed in the rotor of the brushless motor 47 in an integrally rotatable manner. A plurality of groups of light emitting elements and a plurality of groups of light receiving elements are arranged in the stator. The shape of a each pulse signal sent by the optical sensors is adjustable in correspondence with the shape of the slit or the number or the positions of the optical sensors.

The motor control device 50, which performs the position counter learning procedure, does not necessarily have to move the control shaft 16 toward the limit of movement corresponding to the distal end 16b. The control shaft 16 may be moved toward the limit of movement corresponding to the basal end 16a. When the control shaft 16 is located at the limit of movement corresponding to the basal end 16a, the maximum lift amount of the intake valve 9 and the duration angle of the intake cam 11a are both maximum values. In this case, the motor control device 50 stores the detection position counter value Pk at the time when the control shaft 16 is arranged at the limit of movement corresponding to the basal end 16a as the learned value Pr.

The valve actuation parameters varied by the variable valve mechanism 14 do not necessarily have to be those of the intake valve 9 but may be the valve actuation parameters of the exhaust valve 10. Alternatively, the variable valve mechanism 14 may vary the valve actuation parameters of both the intake valve 9 and the exhaust valve 10.

The variable valve mechanism 14 is not restricted to varying the maximum lift amount and the duration of the intake valve 9. The variable valve mechanism 14 may vary any valve actuation parameters, such as the valve opening timing, the valve closing timing, the valve opening period, or the maximum lift amount, of engine valves such as the intake valve 9 or the exhaust valve 10.

The invention claimed is:

1. A control device of a variable valve mechanism, the variable valve mechanism having a motor that varies an actuation parameter of a valve of an internal combustion engine, a rotational angle of the motor being restricted to a set angular range, the control device detecting a current value of the valve actuation parameter based on the motor rotational angle, the control device comprising:
a position sensor that outputs a pulse signal when the motor rotates;
a position counter that calculates a position counter value by counting edges of the pulse signal;
a detecting portion, wherein when in a powered state, the detecting portion obtains a detection value of the motor rotational angle based on the counter value;
a determining portion that detects an operating state of the engine and the powered state of the detecting portion, wherein when detecting that the engine is operating and the detecting portion is in a non-powered state, the determining portion determines that the detection value of the motor rotational angle is displaced from an actual value of the motor rotational angle;
electric angle sensors;
a plurality of electric angle counters each counting an electric angle counter value in accordance with which an energizing phase of a brushless motor is switched, the electric angle counter value being changed cyclically in correspondence with an output pattern of pulse signals output by the electric angle sensors, an interval between the edges of the pulse signals output by the position sensors being set to a value shorter than an interval between edges of the pulse signals output by the electric angle sensors; and
a calculating portion provided in the detecting portion, the calculating portion calculating a change equivalent value based on a first counter value Eg and a second counter value Ei, the first counter value Eg being the electric angle counter value at a time when ignition is turned off, the second counter value being the electric angle counter value at a time when the ignition is turned on for a first time after the ignition is turned off, the change equivalent value being a value obtained by converting, to a counter value of the position counter, a change of the motor rotational angle that is caused in the time from when the ignition is turned off to when the ignition is turned on, and a determination period being set to a value longer than one cycle of each electric angle counter,
wherein the motor is the brushless motor, and
wherein the calculating portion further calculates a correction value, which is a difference between the change equivalent value the position counter value at the time when the ignition is turned off, the correction value being a value that is used for correcting the position counter value such that the position counter value corresponds to the actual value of the motor rotational angle.

2. The control device according to claim 1, wherein the determining portion includes a measuring portion that measures a period in which an engine speed of the engine exceeds a threshold value that is set in advance, and wherein the determining portion determines that the detection value of the motor rotational angle is displaced from the actual value if the determining portion detects that the period is greater than or equal to a determination period that is set in advance and the detecting portion is in the non-powered state.

3. The control device according to claim 2, wherein the measuring portion calculates an accumulated time of the period, and wherein, when it is detected that the accumulated time is greater than or equal to the determination period and that the detecting portion is in the non-powered state, the determining portion determines that the detection value of the motor rotational angle is displaced from the actual value.

4. The control device according to claim 2, wherein the determination period becomes shorter as the engine speed becomes higher.

5. The control device according to claim 1, further comprising:

a communication cable that connects the detecting portion to the determining portion in order to cause mutual communication between the detecting portion and the determining portion, wherein the determining portion determines that the detecting portion is in the non-powered state by determining that the mutual communication is disrupted.

6. The control device according to claim 1, wherein the electric angle counters assign sequential integer values of a range of 0 to m to the electric angle counter value in an ascending order in correspondence with the output pattern of the pulse signals of the electric angle sensors when the brushless motor rotates in a forward direction and in a descending order when the brushless motor rotates in a reverse direction, and wherein the calculating portion calculates the change equivalent value by adding, to a value obtained by multiplying the difference between the first counter value Eg and the second counter value Ei by a number of edges n, a remainder when a position counter value Pg at the time immediately before the ignition is turned off is divided by the number of edges n, the number of edges n being the number of the edges of the pulse signals output by the position sensors in each interval between the edges of the pulse signals output by the electric angle sensors.

7. The control device according to claim 1, wherein, when determining that the detection value of the motor rotational angle is displaced from the actual value, the control device performs initial position learning after a power supply to the detecting portion is started, rotates the motor to a limit of movement of the set angular range, and stores, as an initial position, the position counter value at the time when the motor is located at the limit of movement.

* * * * *